(12) United States Patent
Xie et al.

(10) Patent No.: US 12,166,593 B2
(45) Date of Patent: Dec. 10, 2024

(54) METHODS, APPARATUS AND SYSTEMS FOR TRANSMITTING A DATA FLOW WITH MULTIPLE AUTOMATIC REPEAT REQUEST PROCESSES

(71) Applicant: ZTE Corporation, Guangdong (CN)

(72) Inventors: Feng Xie, Guangdong (CN); Liping Wang, Guangdong (CN); Jun Xiong, Guangdong (CN)

(73) Assignee: ZTE Corporation, Shenzhen (CN)

( * ) Notice: Subject to any disclaimer, the term of this patent is extended or adjusted under 35 U.S.C. 154(b) by 440 days.

(21) Appl. No.: 17/401,953

(22) Filed: Aug. 13, 2021

(65) Prior Publication Data

US 2021/0376969 A1 Dec. 2, 2021

Related U.S. Application Data

(63) Continuation of application No. PCT/CN2019/075008, filed on Feb. 14, 2019.

(51) Int. Cl.
*H04L 1/1867* (2023.01)
(52) U.S. Cl.
CPC ................... *H04L 1/1896* (2013.01)
(58) Field of Classification Search
CPC ................ H04L 1/1896; H04L 1/1822; H04L 2001/0093
See application file for complete search history.

(56) References Cited

U.S. PATENT DOCUMENTS

| | | | |
|---|---|---|---|
| 2006/0092972 A1* | 5/2006 | Petrovic | ............... H04L 1/1822 375/252 |
| 2007/0177630 A1 | 8/2007 | Ranta et al. | |
| 2011/0093754 A1 | 4/2011 | Chun et al. | |
| 2012/0173946 A1 | 7/2012 | Terry et al. | |
| 2016/0255551 A1 | 9/2016 | Susitaival et al. | |
| 2017/0012745 A1 | 1/2017 | Yang | |
| 2017/0164362 A1 | 6/2017 | Terry et al. | |
| 2018/0249388 A1* | 8/2018 | Baek | ................. H04W 36/305 |
| 2019/0320467 A1* | 10/2019 | Freda | ................. H04W 74/004 |

FOREIGN PATENT DOCUMENTS

| | | |
|---|---|---|
| CN | 101346925 A | 1/2009 |
| CN | 101379747 A | 3/2009 |
| CN | 101379752 A | 3/2009 |
| CN | 103220096 A | 7/2013 |
| CN | 103220099 A | 7/2013 |

(Continued)

OTHER PUBLICATIONS

Office Action dated Jun. 23, 2022 for China Patent Application No. 201980092213.2 (12 pages).

(Continued)

*Primary Examiner* — Mandish K Randhawa
(74) *Attorney, Agent, or Firm* — Crowell & Moring LLP

(57) ABSTRACT

Methods, apparatus and systems for wirelessly transmitting a data flow based on a plurality of automatic repeat request (ARQ) processes are disclosed. In one embodiment, a transmitter module in a wireless communication system is configured for corresponding a data flow to a list of automatic repeat request (ARQ) processes that are associated with a same logical channel, and transmitting data of the data flow based on the list of ARQ processes.

15 Claims, 7 Drawing Sheets

(56) References Cited

FOREIGN PATENT DOCUMENTS

| CN | 109217974 A | 1/2019 |
|---|---|---|
| EP | 1 389 848 A1 | 2/2004 |
| EP | 2 648 356 A1 | 10/2013 |
| KR | 10-2009-0068317 | 6/2009 |
| WO | 1 389 848 A1 | 2/2004 |
| WO | 3022963 A1 | 1/2015 |
| WO | WO 2018/064367 A1 | 4/2018 |
| WO | WO 2018/082577 A1 | 5/2018 |
| WO | WO 2018/127421 A1 | 7/2018 |

OTHER PUBLICATIONS

Third Office Action received for China Patent Application No. 201980092213.2 mailed May 5, 2023 (English and Chinese languages) (11 pages).
Second Office Action received for China Patent Application No. 201980092213.2 mailed Jan. 10, 2023 (English and Chinese languages) (21 pages).
International Search Report and Written Opinion received for Application No. PCT/CN2019/075008 mailed Nov. 15, 2019 (6 pages).
Extended European Search Report received for Application No. EP 19914984.0 mailed Aug. 16, 2022 (8 pages).
First Examination Report received for India Application No. 202127035069 mailed Mar. 16, 2022 (5 pages).
Hearing Notice received for India Patent Application No. 202127035069 mailed Apr. 25, 2024 (Indian language only) (2 pages).
Office Action received for Korea Patent Application No.10-2021-7028374 mailed Apr. 12, 2024 (Chinese language, with English summary) (7 pages).
Notice of Allowance received for Korea Patent Application No. 10-2021-7028374 mailed Aug. 26, 2024 (with English summary) (9 pages).
Communication for EP Patent Application No. 19 914 984.0 dated Oct. 8, 2024 (3 pages).
3GPP TSG-RAN3 Meeting #50, Tdoc R2-060040, "Mapping of (default) IP Connectivity Service on the Radio Interface," Source: Samsung, Agenda Item: 7.1, Cannes, France Jan. 9-13, 2006 (12 pages).

* cited by examiner

100

METHODS, APPARATUS AND SYSTEMS FOR TRANSMITTING A DATA FLOW WITH MULTIPLE AUTOMATIC REPEAT REQUEST PROCESSES

PRIORITY

This application claims priority as a Continuation of PCT/CN2019/075008, filed on Feb. 14, 2019, entitled "Methods, apparatus and systems for transmitting a data flow with multiple automatic repeat request processes", published as WO 2020/164032, the entire disclosure of which is hereby incorporated by reference.

TECHNICAL FIELD

The disclosure relates generally to wireless communications and, more particularly, to methods, apparatus and systems for wirelessly transmitting a data flow based on a list of automatic repeat request (ARQ) processes.

BACKGROUND

The fourth Generation mobile communication technology (4G) Long-Term Evolution (LTE) or LTE-Advance (LTE-A) and the fifth Generation (5G) new radio (NR) mobile communication technology face more and more demands. Based on the current development trend, 4G and 5G systems are developing supports on features of enhanced mobile broadband (eMBB), ultra-reliable low-latency communication (URLLC), and massive machine-type communication (mMTC).

In an existing NR radio access network, the layer 2 (L2) above a physical (PHY) layer includes a service data adaptation protocol (SDAP) layer, a packet data convergence protocol (PDCP) layer, a radio link control (RLC) layer, and a medium access control (MAC) layer. The L2 of the NR system can ensure the reliability of data transmission at the receiving and transmitting sides through an automatic repeat request (ARQ) function. Specifically, the RLC layer of the NR system can establish an RLC entity for each data radio bear (DRB); and each RLC entity starts an ARQ process for the corresponding DRB. The transmitting end maintains and updates a transmission window, a transmission variable, and a transmission timer for each ARQ process. The receiving end maintains and updates a receiving window, a receiving variable, and a receiving timer for each ARQ process. The transmitting end of each ARQ process performs corresponding data retransmission based on the RLC status report fed back by the receiving end to ensure that each data unit of each DRB can be successfully received by the receiving end. However, in a scenario of a large-bandwidth and high-speed data service (e.g. an eMBB service), the ARQ window at the receiving end may have a congestion due to the excessive data volume, thereby affecting the data transmission efficiency at the air interface.

Thus, existing systems and methods for transmitting a data flow like DRB based on ARQ in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a transmitter module in a wireless communication system is disclosed. The method comprises: corresponding a data flow to a list of automatic repeat request (ARQ) processes that are associated with a same logical channel; and transmitting data of the data flow based on the list of ARQ processes.

In another embodiment, a method performed by a receiver module in a wireless communication system is disclosed. The method comprises: receiving data of a data flow through a same logical channel based on a list of automatic repeat request (ARQ) processes, wherein the list of ARQ processes corresponds to the data flow and are associated with the same logical channel.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
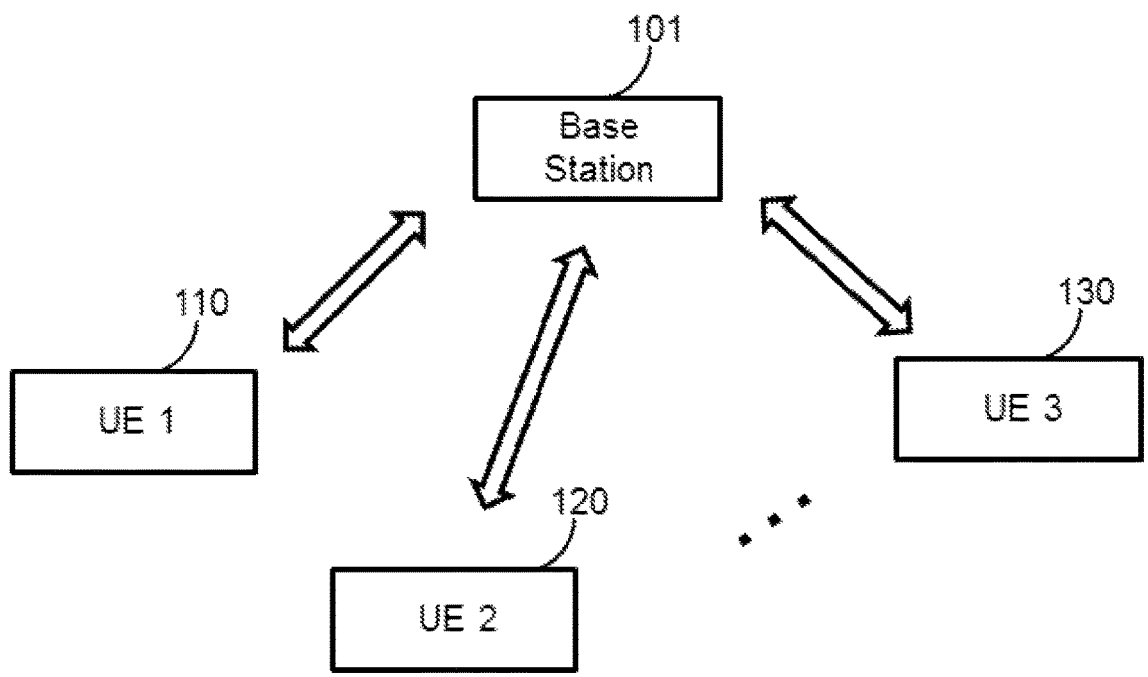
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

To solve the problem of ARQ window congestion in a data service scenario requiring a large bandwidth and a high transmission rate, the present teaching proposes a scheme in which one RLC entity can enable multiple ARQ processes for one DRB. For example, when processing a DRB with large bandwidth and high speed requirements, the RLC entity may configure multiple ARQ processes for the DRB to perform parallel processing. For the same DRB, each of the transmitter and the receiver maintains multiple ARQ processes. Each ARQ process independently maintains a transmission window, a transmission variable, and a transmission timer at the transmitter; and a receiving window, a receiving variable, and a receiving timer at the receiver. At the same time, each ARQ process has its own independent ARQ process ID. The data units between the ARQ processes have independent sequence numbers (SNs) that are not shared by each other. This ensures clear and error-free reception of multiple ARQ processes of the same DRB. In addition, the RLC layer supports an out-of-order delivery of data packets. As such, when the receiving end processes multiple ARQ processes of the same DRB, data packets and units can be delivered in an out-of-order manner within each ARQ process and across ARQ processes.

For data units of different DRBs, each data unit has a DRB ID or a flow ID like QoS flow identifier (QFI), an ARQ process ID or an ARQ entity ID when one DRB has multiple ARQ processes, for the receiving end to distinguish the data units. When a DRB supports multiple parallel ARQ processes, the window size or length of each ARQ process will be relatively short, and the number of bits of the SN will be relatively small, so that the data processing at the receiving end is more flexible and will not cause air interface congestion. In addition, for the DRBs with different service requirements, the number of supported ARQ processes can be flexibly configured according to the service requirements. In one embodiment, one DRB can support multiple ARQ processes. In another embodiment, multiple DRBs can be combined to support one ARQ process.

As used herein, the term "layer" refers to an abstraction layer of a layered model, e.g. the open systems interconnection (OSI) model, which partitions a communication system into abstraction layers. A layer serves the next higher layer above it, and is served by the next lower layer below it.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes" or "wireless communication modules"; and a UE may be described herein as non-limiting examples of "wireless communication devices." The BS and UE can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. A transmitter module, e.g. the BS 101, may use a retransmission scheme to ensure transmission reliability to a receiver module, e.g. a UE. The BS 101 may transmit each data flow, e.g. a DRB, based on multiple ARQ processes. That is, the BS 101 may distribute data units of the data flow into the multiple ARQ processes, and perform a retransmission scheme for each ARQ process independently. In another embodiment, the transmission module may be the UE, and the receiver module may be the BS 101, while a similar retransmission scheme can be applied.

Figure 2:
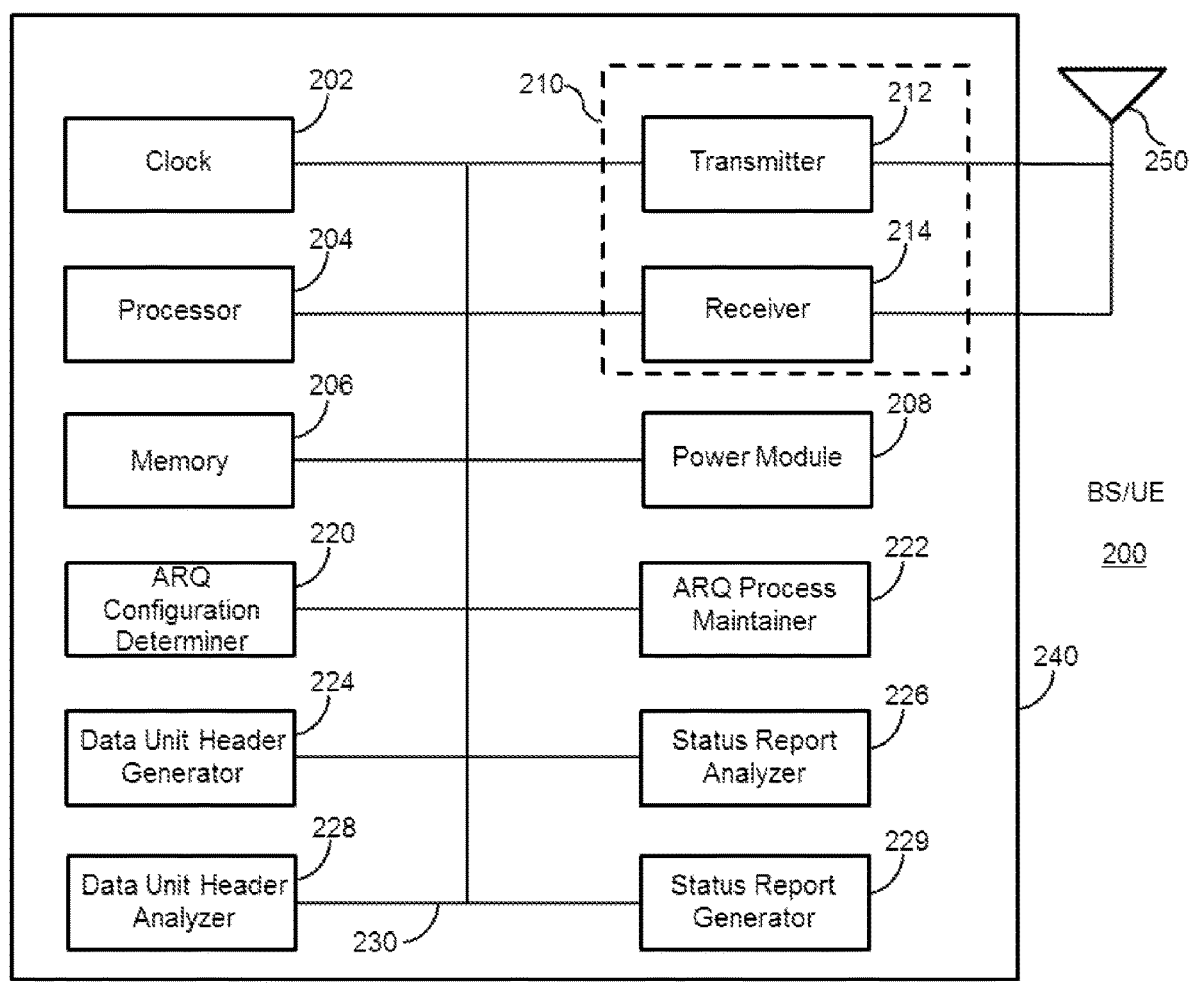
FIG. 2 illustrates a block diagram of a base station (BS) and/or a user equipment (UE), in accordance with some embodiments of the present disclosure.

FIG. 2 illustrates a block diagram of a node 200, which may be a base station (BS) and/or a user equipment (UE), in accordance with some embodiments of the present disclosure. The node 200 is an example of a module or device that can be configured to implement the various methods described herein. As shown in FIG. 2, the node 200 includes a housing 240 containing a system clock 202, a processor 204, a memory 206, a transceiver 210 comprising a transmitter 212 and receiver 214, a power module 208, an ARQ configuration determiner 220, an ARQ process maintainer 222, a data unit header generator 224, a status report analyzer 226, a data unit header analyzer 228, and a status report generator 229.

In this embodiment, the system clock 202 provides the timing signals to the processor 204 for controlling the timing of all operations of the node 200. The processor 204 controls the general operation of the node 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the node 200 to transmit and receive data to and from a remote device (e.g., the BS or another UE). An antenna 250 is typically attached to the housing 240 and electrically coupled to the transceiver 210. In various embodiments, the node 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the node 200 may serve either as a transmitter module or as a receiver module. In one scenario when serving as a transmitter module, the ARQ configuration determiner 220 of the node 200 may correspond a data flow to a plurality or a list of automatic repeat request (ARQ) processes that are associated with a same logical channel. In one embodiment, the data flow is a data radio bearer (DRB); and each of the data units of the DRB is a protocol data unit (PDU) at a radio link control (RLC) layer. That is, one RLC entity at the node 200 can enable multiple ARQ processes for one DRB. In one embodiment, each of a plurality of data flows transmitted by the transmitter module is configured with at least one ARQ process whose quantity is determined based on a service requirement of the data flow. In another embodiment, at least two of the plurality of data flows are supported by a same ARQ process.

In one embodiment, the ARQ configuration determiner 220 may obtain a configuration for the data flow from a control plane of the transmitter module. The configuration comprises information related to at least one of: a quantity of the plurality of ARQ processes; and a strategy for distributing data units of the data flow into the plurality of ARQ processes. The ARQ configuration determiner 220 may forward the configuration information to the ARQ process maintainer 222 for establishing and maintaining ARQ processes.

The ARQ process maintainer 222 in this scenario may establish the plurality of ARQ processes based on the quantity in the configuration. The ARQ process maintainer 222 may also assign each data unit of the data flow to a corresponding one of the plurality of ARQ processes based on the strategy. The data unit is transmitted based on the corresponding ARQ process. In one embodiment, the ARQ process maintainer 222 maintains, independently for each of the plurality of ARQ processes, at least one of the following: a transmission window; a transmission variable; and a transmission timer. The ARQ process maintainer 222 may transmit, via the transmitter 212, data of the data flow based on the plurality of ARQ processes.

The data unit header generator 224 in this scenario may generate and add a header to each data unit distributed to a corresponding ARQ process. The header comprises information related to at least one of: an ARQ process ID identifying the corresponding ARQ process; and a sequence number (SN) allocated to the data unit. For example, the data unit header generator 224 may allocate a sequence number to each data unit distributed to a corresponding ARQ process, in a manner such that: data units distributed to a same ARQ process are allocated with sequence numbers in sequential order; and data units distributed to different ARQ processes are allocated with sequence numbers independently.

The status report analyzer 226 in this scenario may request and receive a status report from a receiver module in the wireless communication system. The status report comprises feedback information regarding data transmission associated with a corresponding one of the plurality of ARQ processes. In one embodiment, the status report carries information related to an ARQ process ID identifying the corresponding ARQ process.

In another scenario, the node 200 serves as a receiver module. In this scenario, the ARQ process maintainer 222 receives data of a data flow through a same logical channel based on a plurality of automatic repeat request (ARQ) processes. The plurality of ARQ processes corresponds to the data flow and are associated with the same logical channel. In one embodiment, the data flow is a data radio bearer (DRB); and each of the data units of the DRB is a protocol data unit (PDU) at a radio link control (RLC) layer. That is, one RLC entity at the node 200 can support multiple ARQ processes for one DRB. In one embodiment, data units of the data flow are distributed into the plurality of ARQ processes; and each data unit distributed to a corresponding ARQ process is allocated with a sequence number. In one example, data units distributed to a same ARQ process are allocated with sequence numbers in sequential order; and data units distributed to different ARQ processes are allocated with sequence numbers independently.

The ARQ configuration determiner 220 in this scenario obtains a configuration for the data flow from a control plane. The configuration comprises information related to a quantity of the plurality of ARQ processes. In one embodiment, each of a plurality of data flows transmitted by the transmitter module is configured with at least one ARQ process whose quantity is determined based on a service requirement of the data flow. In another embodiment, at least two of the plurality of data flows are supported by a same ARQ process. The ARQ process maintainer 222 in this scenario maintains, independently for each of the plurality of ARQ processes, at least one of the following: a receiving window; a receiving variable; and a receiving timer.

The node 200 in this scenario may receive a data unit of the data flow. The data unit header analyzer 228 in this scenario may read and analyze a header of the data unit. In one embodiment, the ARQ process maintainer 222 may receive the data unit and forward it to the data unit header analyzer 228 for header analysis. In another embodiment, the data unit header analyzer 228 may receive the data unit. Based on a header of the data unit, the data unit header analyzer 228 can determine information related to at least one of: an ARQ process ID identifying a corresponding one of the plurality of ARQ processes, and a sequence number allocated to the data unit. The data unit header analyzer 228 may assign the data unit to the corresponding one of the plurality of ARQ processes for data processing.

The status report generator 229 in this scenario may receive a feedback request, e.g. a polling in a data unit, from a transmitter module that transmits the data flow. In response to the feedback request, the status report generator 229 can generate a status report comprising feedback information regarding data transmission associated with a corresponding one of the plurality of ARQ processes, and transmit the status report to the transmitter module. In one embodiment, the status report carries information related to an ARQ process ID identifying the corresponding ARQ process.

The power module 208 can include a power source such as one or more batteries, and a power regulator, to provide regulated power to each of the above-described modules in FIG. 2. In some embodiments, if the node 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the node 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the ARQ process maintainer 222. Conversely, each of the modules illustrated in FIG. 2 can be implemented using a plurality of separate components or elements.

Figure 3:
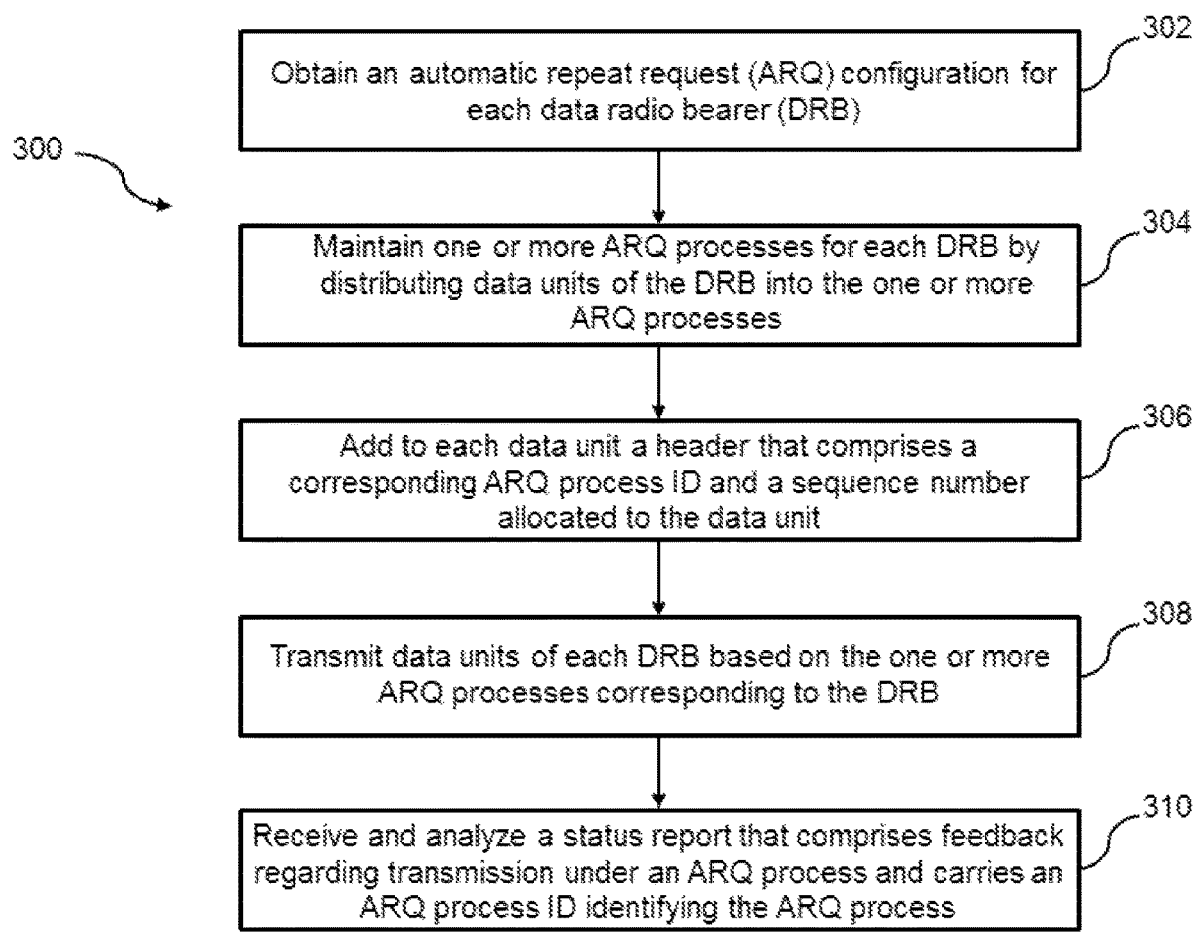
FIG. 3 illustrates a flow chart for a method performed by a BS or a UE for data flow transmission based on a plurality of automatic repeat request (ARQ) processes as a transmitter module, in accordance with some embodiments of the present disclosure.

FIG. 3 illustrates a flow chart for a method 300 performed by a wireless communication node, e.g. the node 200 in FIG. 2, for data flow transmission based on a plurality of automatic repeat request (ARQ) processes as a transmitter module, in accordance with some embodiments of the present disclosure. At operation 302, an automatic repeat request (ARQ) configuration is obtained for each data radio bearer (DRB). At operation 304, one or more ARQ processes are maintained for each DRB by distributing data units of the DRB into the one or more ARQ processes. At operation 306, a header is added to each data unit. The header comprises a corresponding ARQ process ID and a sequence number allocated to the data unit. At operation 308, data units of each DRB are transmitted based on the one or more ARQ processes corresponding to the DRB. At operation 310, a status report is received and analyzed. The status report comprises feedback regarding transmission under an ARQ process and carries an ARQ process ID identifying the ARQ process. The order of the operations shown in FIG. 3 may be changed according to different embodiments of the present disclosure.

Figure 4:
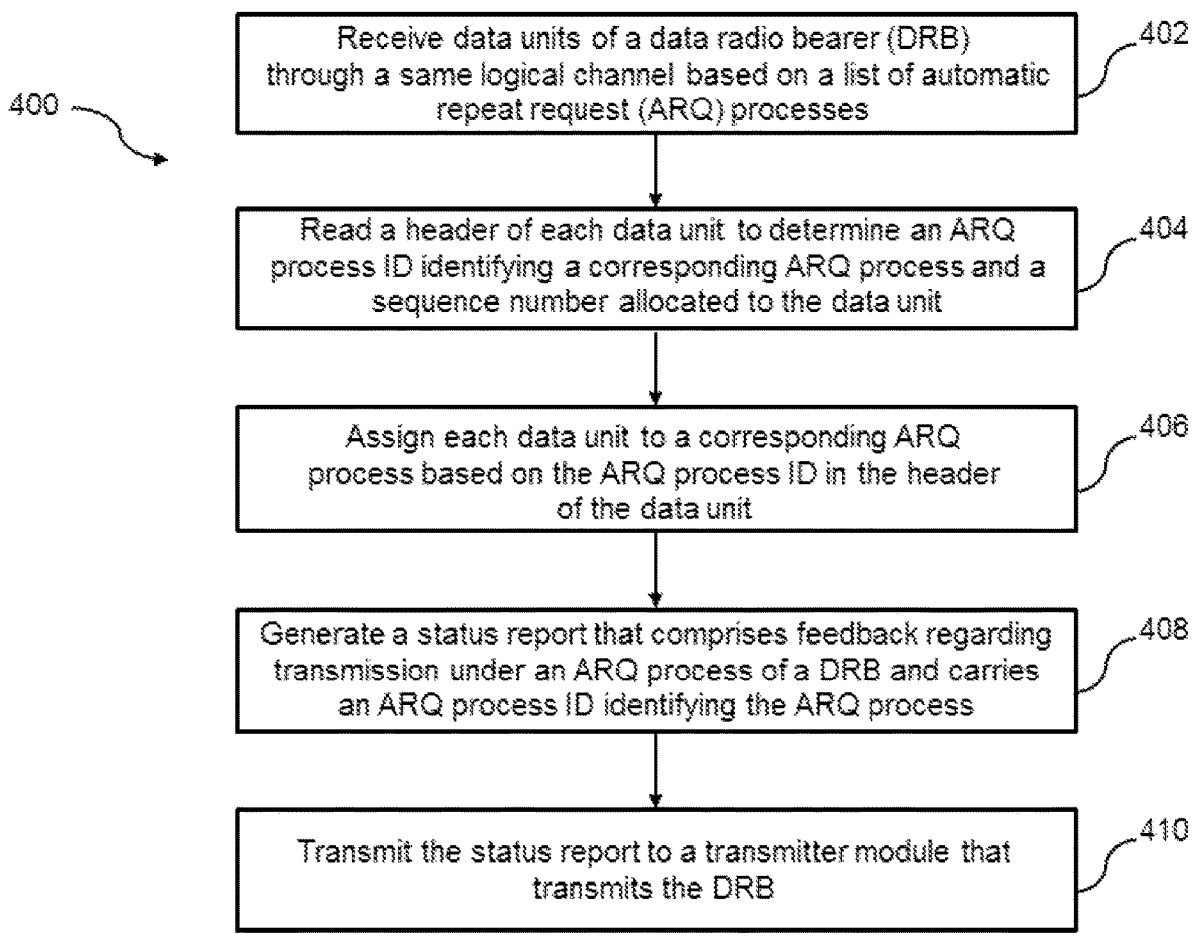
FIG. 4 illustrates a flow chart for a method performed by a BS or a UE for data flow transmission based on a plurality of ARQ processes as a receiver module, in accordance with some embodiments of the present disclosure.

FIG. 4 illustrates a flow chart for a method 400 performed by a wireless communication node, e.g. the node 200 in FIG. 2, for data flow transmission based on a plurality of ARQ processes as a receiver module, in accordance with some embodiments of the present disclosure. At operation 402, data units of a data radio bearer (DRB) are received through a same logical channel based on a list of automatic repeat request (ARQ) processes. At operation 404, a header of each data unit is read to determine an ARQ process ID identifying a corresponding ARQ process and a sequence number allocated to the data unit. At operation 406, each data unit is assigned to a corresponding ARQ process based on the ARQ process ID in the header of the data unit. At operation 408, a status report is generated. The status report comprises feedback regarding transmission under an ARQ process of a DRB and carries an ARQ process ID identifying the ARQ process. At operation 410, the status report is transmitted to a transmitter module that transmits the DRB. The order of the operations shown in FIG. 4 may be changed according to different embodiments of the present disclosure.

Different embodiments of the present disclosure will now be described in detail hereinafter. It is noted that the features of the embodiments and examples in the present disclosure may be combined with each other in any manner without conflict.

The present teaching proposes methods and systems for processing multiple ARQ processes. In one embodiment, one RLC entity can enable multiple ARQ processes for one DRB. That is, a bearer DRB or data flow of L2 can support parallel processing of multiple ARQ processes. The multiple ARQ processes are multiplexed into a same logical channel. A sub-header of each RLC data packet carries an ARQ process ID; and a sub-header of each RLC status report packet carries an ARQ process ID. Each RLC entity at the transmitting end maintains a transmitting end window, a transmitting end variable, and a transmitting end timer independently for each ARQ process. Each RLC entity at the receiving end maintains a receiving end window, a receiving end variable, and a receiving end timer independently for each ARQ process. In one example, each ARQ process has SN numbers independent from other ARQ processes; each RLC status report includes a process ID identifying a corresponding ARQ process. The network side control plane may configure the number of ARQ processes and a data distribution strategy for the transmitting end of each DRB. The network side control plane may configure the number of ARQ processes for the receiving end of each DRB.

Figure 5:
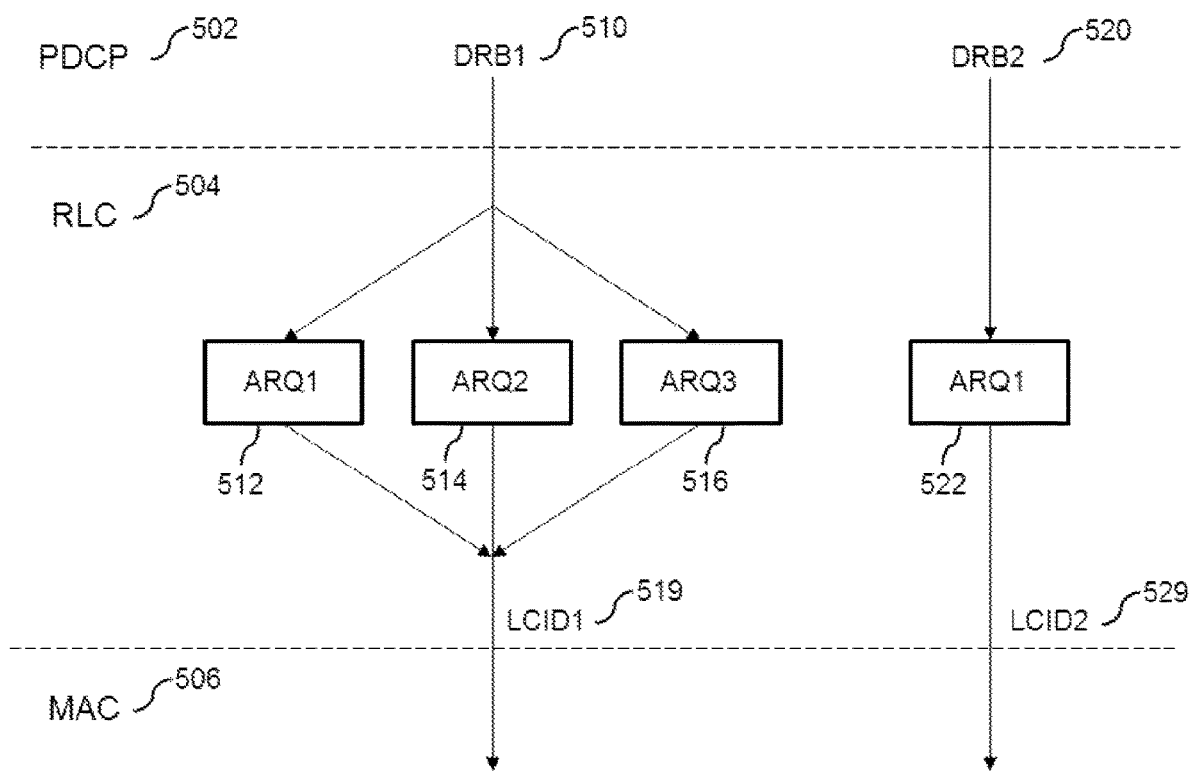
FIG. 5 illustrates an exemplary data processing method at a transmitter module, in accordance with some embodiments of the present disclosure.

In a first embodiment, a method is disclosed for data processing at a transmitter module or transmitting end, where one DRB can support multiple ARQ processes. FIG. 5 illustrates an exemplary data processing method at a transmitter module, in accordance with the first embodiment of the present disclosure. The method may comprise the following exemplary steps.

In Step 1, when performing data transmission for a large-bandwidth and high-rate service, the PDCP layer 502 at the transmitting end receives the data-bearing DRBs 510, 520 from an upper layer. The PDCP layer 502 performs data processing including robust header compression (RoHC), ciphering, etc. on the data of the DRBs 510, 520, and then delivers the data to the RLC layer 504 below the PDCP layer 502.

In Step 2, after receiving the DRB data sent by the PDCP layer 502, the RLC layer 504 of the transmitting end establishes a corresponding number of ARQ processes for each DRB according to a configuration from the control plane at the network side. The configuration may indicate a number of configured ARQ processes and a data distribution policy between ARQ processes. For example, the DRB1 510 corresponds to three ARQ processes ARQ1 512, ARQ2 514, and ARQ3 516. According to service requirements, some DRB, e.g. the DRB2 520, may still support one single ARQ process ARQ1 522. Based on the data distribution policy, the RLC layer 504 may distribute data units of the DRB1 510 among the three ARQ processes.

In Step 3, for the data units in each ARQ process of the multiple ARQ process corresponding to a DRB, e.g. the DRB1 510, the RLC layer 504 of the transmitting end performs SN numbering, segmentation, etc. on each data unit or data packet, e.g. an RLC protocol data unit (PDU). The RLC layer 504 also marks the ARQ process ID and the SN number in a sub-header of each data packet. In addition, the RLC layer 504 updates one or more variables related to a transmission window of each ARQ process. After the data processing is completed, the RLC layer 504 will deliver the data to the MAC layer 506 through a logical channel (LCH) where the DRB is located. As shown in FIG. 5, the DRB1 510 is located at the logical channel with logical channel ID 1 519; the DRB2 520 is located at the logical channel with logical channel ID 2 529. That is, the three ARQ processes ARQ1 512, ARQ2 514, and ARQ3 516 are associated with the LCID1 519; while the ARQ process ARQ1 522 is associated with the LCID2 529.

In Step 4, for data in each ARQ process of the multiple ARQ processes corresponding to a DRB, after the RLC layer 504 of the transmitting end processes one data packet and submits it to the MAC layer 506, a total number of packets and a total number of bytes processed by the transmitting end under the ARQ process are counted and accumulated. When either the total number of packets or the total number of bytes reaches a preset threshold, the RLC layer 504 at the transmitting end adds a Polling indication to the sub-header of the next packet to be sent, to instruct the receiving end to provide an RLC status report as a feedback for the ARQ process.

In Step 5, if the RLC layer 504 of the transmitting end receives the RLC status report feedback from the receiving end regarding an ARQ process of a DRB, the transmitting end reads the status report. The RLC layer 504 of the transmitting end clears any data packet indicated as acknowledgement (ACK) in the status report from the transmitting end cache corresponding to the ARQ process. The RLC layer 504 of the transmitting end retransmits any data packet indicated as negative acknowledgement (NACK) in the status report. In addition, the RLC layer 504 of the transmitting end updates variables of the transmission window corresponding to the ARQ process and moves the transmission window forward.

In Step 6, the MAC layer 506 of the transmitting end receives the data of each DRB transmitted by the RLC layer 504 through each logical channel, and performs corresponding logical channel multiplexing and priority processing. The MAC layer 506 delivers the grouped MAC PDUs to the PHY layer in the form of transport blocks (TBs), and indicates the PHY layer to transmit the TBs to the receiving end via an air interface. The order of the steps in this embodiment may be changed according to different embodiments of the present disclosure.

Figure 6:
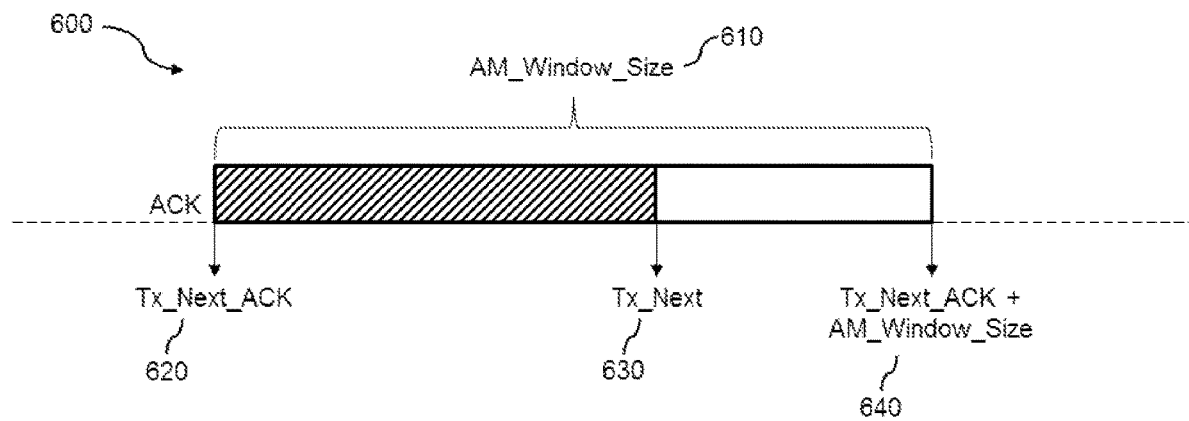
FIG. 6 illustrates an exemplary transmission window of a transmitter module, in accordance with some embodiments of the present disclosure.

FIG. 6 illustrates an exemplary transmission window 600 of a transmitter module, in accordance with some embodiments of the present disclosure. As shown in FIG. 6, the transmission window 600 of the transmitter module has a lower boundary Tx_Next_Ack 620 which is included in the transmission window 600, and an upper boundary of Tx_Next_Ack+AM_Window_Size 640 which is not included in the transmission window 600.

The AM_Window_Size 610 represents a size of the transmission window 600 under an acknowledgement mode (AM). The Tx_Next_Ack 620 here is a status variable that holds the SN value of the next acknowledgement mode data (AMD) PDU to be received with a positive acknowledgment. This variable corresponds to the lower boundary of the transmission window 600. The variable is initialized to 0, and is updated when the AM entity receives a positive acknowledgment for an AMD PDU of SN=Tx_Next_Ack. At this time, Tx_Next_Ack is set to the SN value of the AMD PDU which has the minimum SN value among AMD PDUs that have not received a positive acknowledgement. The transmitter module considers that all AMD PDUs with SN<Tx_Next_Ack have been successfully received by the receiver module, and the transmitter module has received a positive acknowledgment of each of these AMD PDUs.

Here, Tx_Next 630 represents a SN of the next data packet to be numbered. This variable holds the SN value that will be assigned to the next newly generated AMD PDU. This variable is initialized to 0 and is updated when the AM RLC entity sends an AMD PDU with SN=TX_Next to the MAC layer.

The data packets on the left side of the transmission window 600, i.e., the data packets whose SNs are smaller than Tx_Next_Ack, are data packets that have been acknowledged by the receiving end. These packets are cleared by the transmitting end in the cache. The data packets in the padding area between the Tx_Next_Ack 620 and the Tx_Next 630 in the transmission window 600, i.e., the data packets whose SNs are greater than or equal to Tx_Next_Ack and less than TX_Next, are data packets waiting for the feedback status report from the receiving end.

Figure 7:
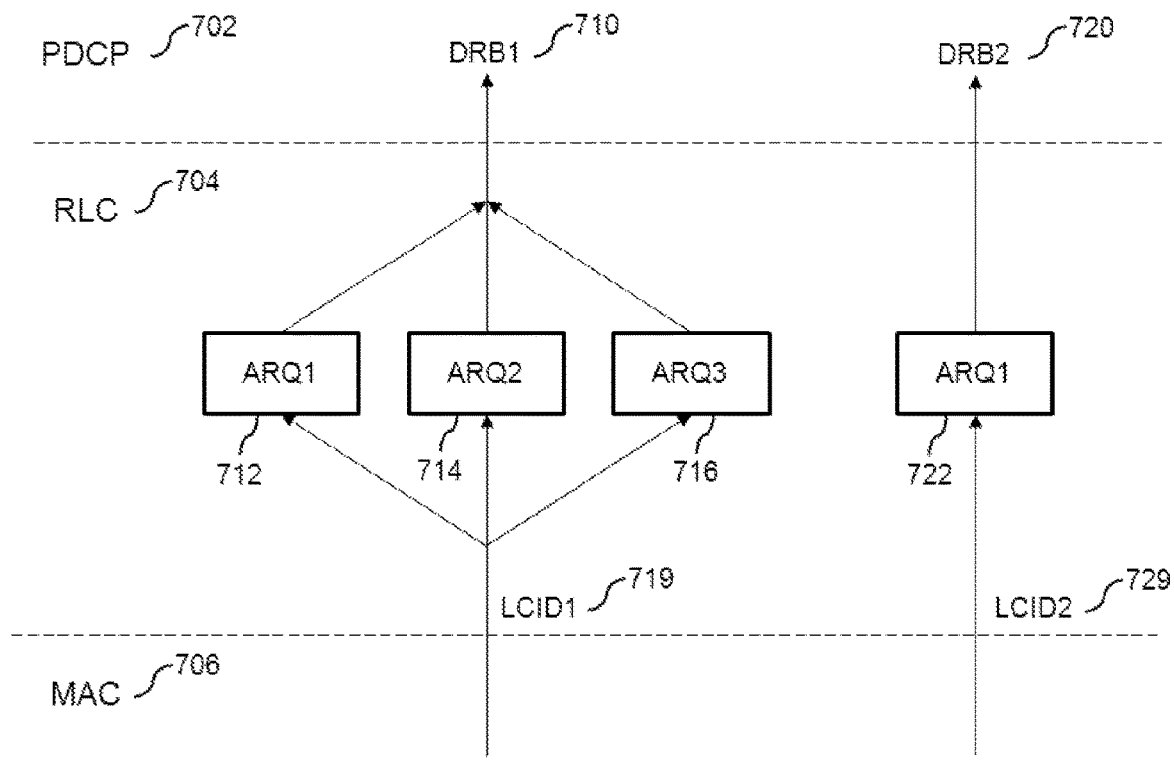
FIG. 7 illustrates an exemplary data processing method at a receiver module, in accordance with some embodiments of the present disclosure.

In a second embodiment, a method is disclosed for data processing at a receiver module or receiving end, where one DRB can support multiple ARQ processes. FIG. 7 illustrates an exemplary data processing method at a receiver module, in accordance with the second embodiment of the present disclosure. The method may comprise the following exemplary steps.

In Step 1, when performing data transmission for a large-bandwidth and high-rate service, the PHY layer at the receiving end receives data of DRBs via the air interface, e.g. in forms of TBs. The PHY layer delivers the TBs upward to the MAC layer 706. The MAC layer 706 reads each MAC PDU from the TB and performs de-multiplexing on the MAC PDU to obtain data of each logical channel. After the MAC layer 706 performs data processing on the obtained data packets, each data packet is delivered to the RLC layer 704 through a corresponding logical channel.

In Step 2, the RLC layer 704 at the receiving end receives the DRB data through the logical channel. For the DRB configured with multiple ARQ processes, data packets are distributed to different ARQ processes according to the process information in the sub-headers of the data packets.

For example, the DRB1 710 corresponds to three ARQ processes ARQ1 712, ARQ2 714, and ARQ3 716. According to service requirements, some DRB, e.g. the DRB2 720, may still correspond to a single ARQ process ARQ1 722. The RLC layer 704 at the receiving end maintains a set of receiving end window, receiving end variable, and receiving end timer for each ARQ process, and performs RLC layer processing (including reassembly and ARQ processing) on the data according to the SN information of the data. As shown in FIG. 7, the DRB1 710 is located at the logical channel with logical channel ID 1 719; the DRB2 720 is located at the logical channel with logical channel ID 2 729. That is, the three ARQ processes ARQ1 712, ARQ2 714, and ARQ3 716 are associated with the LCID1 719; while the ARQ process ARQ1 722 is associated with the LCID2 729.

In Step 3, when the RLC layer 704 at the receiving end receives a data packet including a Polling indication in an ARQ process or when a reassembly timer at the receiving end expires under an ARQ process, the receiving end generates an RLC status report according to the data receiving status in the current ARQ process, e.g. in terms of ACK/NACK. The receiving end sends the RLC status report as a feedback to the transmitting end at the next feedback time. The RLC status report carries the ARQ process ID which identifies the current ARQ process.

In Step 4, the RLC layer 704 forwards the data processed in each ARQ process under a same DRB to the PDCP layer 702 through the DRB pipeline.

In Step 5, the PDCP layer 702 performs corresponding data processing like RoHC, deciphering, sorting, etc. in units of DRB and delivers the processed data to the upper layer. The order of the steps in this embodiment may be changed according to different embodiments of the present disclosure.

Figure 8:
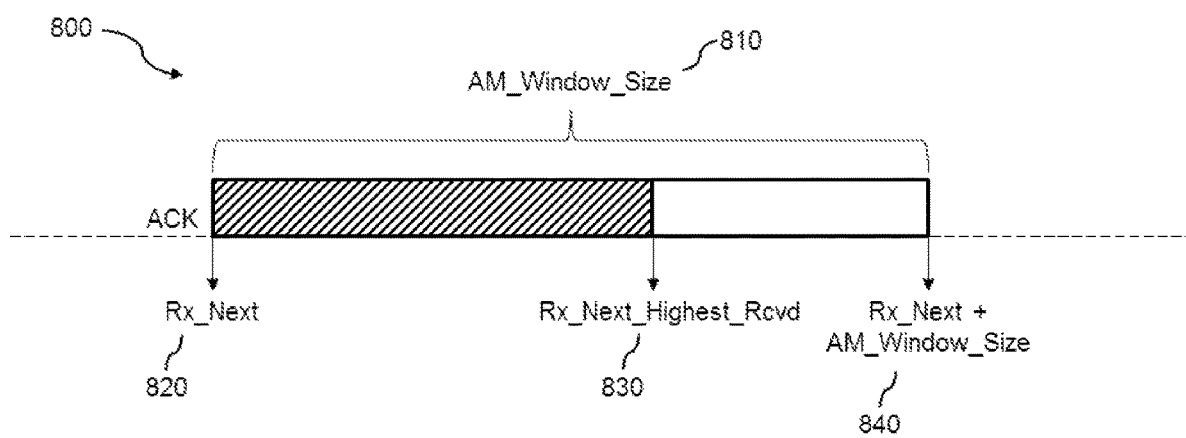
FIG. 8 illustrates an exemplary receiving window of a receiver module, in accordance with some embodiments of the present disclosure.

FIG. 8 illustrates an exemplary receiving window 800 of a receiver module, in accordance with some embodiments of the present disclosure. As shown in FIG. 8, the RLC receiving window 800 of the receiver module has a lower boundary Rx_Next 820 which is included in the receiving window 800, and an upper boundary of Rx_Next+AM_Window_Size 840 which is not included in the receiving window 800.

The AM_Window_Size 810 represents a size or length of the receiving window 800 under an acknowledgement mode (AM). For example, AM_Window_Size=2048 when a 12-bit SN is used, and AM_Window_Size=131072 when an 18-bit SN is used.

The Rx_Next 820 here represents the next SN of a SN of the last packet in a group of latest data packets consecutively and completely received by the receiving end. That is, the lower boundary of the receiving window 800 is the SN of the first packet to be reassembled.

Here, the Rx_Next_Highest_Rcvd represents a maximum SN in the receive window 800, or a next SN of the largest SN of all packets successfully received at the receiving end.

The receiving end does not receive the data packets outside the receiving window 800. That is, at the current time, the receiving end does not receive data packets whose SN values are smaller than Rx_Next 820 or greater than or equal to Rx_Next+AM_Window_Size 840. The RLC AM entity at the receiving end may adopt a PUSH type to move the receiving window 800. That is, the movement of the lower boundary of the receiving window 800 pushes the upper boundary of the receiving window 800 to move.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

We claim:

1. A method performed by a transmitter module in a wireless communication system, the method comprising:
corresponding a data flow to at least one automatic repeat request (ARQ) process in a list of automatic repeat request (ARQ) processes that are associated with a same logical channel; and
transmitting data of the data flow based on the list of ARQ processes,
wherein a number of the at least one ARQ process corresponding to the data flow is determined based on a service requirement of the data flow,
wherein the data flow is a data radio bearer (DRB),
the method further comprising:
obtaining a configuration for the data flow from a control plane, wherein the configuration comprises information related to a quantity of the list of ARQ processes; and
allocating a sequence number to each data unit distributed to a corresponding ARQ process,
wherein data units between the ARQ processes have independent sequence numbers (SNs) which are not shared between the ARQ processes.

2. The method of claim 1, wherein the configuration further comprises information related to at least one of: an identity (ID) of the data flow and an ID of the logical channel.

3. The method of claim 1, further comprising:
adding a header to each data unit distributed to a corresponding ARQ process, wherein the header comprises information related to at least one of:
an ARQ process ID identifying the corresponding ARQ process; and
the sequence number allocated to the data unit.

4. The method of claim 1, further comprising:
maintaining, independently for each of the list of ARQ processes, at least one of the following:
a transmission window;
a transmission variable; or
a transmission timer.

5. The method of claim 1, further comprising:
receiving a status report from a receiver module in the wireless communication system, wherein the status report comprises feedback information regarding data transmission associated with a corresponding one of the list of ARQ processes, wherein the status report carries information related to an ARQ process ID identifying the corresponding ARQ process.

6. The method of claim 1, wherein at least two of the plurality of data flows are supported by a same ARQ process.

7. A method performed by a receiver module in a wireless communication system, the method comprising:
receiving data of a data flow through a same logical channel based on at least one automatic repeat request (ARQ) process in a list of ARQ processes, wherein the list of ARQ processes corresponds to the data flow and are associated with the same logical channel,
wherein a number of the at least one ARQ process corresponding to the data flow is determined based on a service requirement of the data flow,
wherein the data flow is a data radio bearer (DRB),
further comprising:
obtaining a configuration for the data flow from a control plane, wherein the configuration comprises information related to a quantity of the list of ARQ processes,
wherein each data unit distributed to a corresponding ARQ process is allocated with a sequence number,
wherein data units between the ARQ processes have independent sequence numbers (SNs) which are not shared between the ARQ processes.

8. The method of claim 7, wherein data units of the data flow are distributed into the list of ARQ processes.

9. The method of claim 7, wherein receiving the data further comprises:
receiving a data unit of the data flow; and
based on a header of the data unit, determining information related to at least one of:
an ARQ process ID identifying a corresponding one of the list of ARQ processes, and
a sequence number allocated to the data unit.

10. The method of claim 9, further comprising:
assigning the data unit to the corresponding one of the list of ARQ processes.

11. The method of claim 7, further comprising:
generating a status report comprising feedback information regarding data transmission associated with a corresponding one of the list of ARQ processes; and
transmitting the status report to a transmitter module that transmits the data flow, wherein the status report carries information related to an ARQ process ID identifying the corresponding ARQ process.

12. The method of claim 11, wherein at least two of the plurality of data flows are supported by a same ARQ process.

13. The method of claim 7, further comprising:
maintaining, independently for each of the list of ARQ processes, at least one of the following:
a receiving window;
a receiving variable; or
a receiving timer.

14. A wireless communication device comprising:
at least one processing device configured to:
correspond a data flow to at least one automatic repeat request (ARQ) process in a list of automatic repeat request (ARQ) processes that are associated with a same logical channel;
transmit data of the data flow based on the list of ARQ processes,
wherein a number of the at least one ARQ process corresponding to the data flow is determined based on a service requirement of the data flow,
wherein the data flow is a data radio bearer (DRB);
obtain a configuration for the data flow from a control plane, wherein the configuration comprises information related to a quantity of the list of ARQ processes; and
allocate a sequence number to each data unit distributed to a corresponding ARQ process,
wherein data units between the ARQ processes have independent sequence numbers (SNs) which are not shared between the ARQ processes.

15. A non-transitory computer-readable medium having stored thereon computer-executable instructions for:
corresponding a data flow to at least one automatic repeat request (ARQ) process in a list of ARQ processes that are associated with a same logical channel; and
transmitting data of the data flow based on the list of ARQ processes,
wherein a number of the at least one ARQ process corresponding to the data flow is determined based on a service requirement of the data flow,
wherein the data flow is a data radio bearer (DRB),
the computer-executable instructions further configured for:
obtaining a configuration for the data flow from a control plane, wherein the configuration comprises information related to a quantity of the list of ARQ processes; and
allocating a sequence number to each data unit distributed to a corresponding ARQ process,
wherein data units between the ARQ processes have independent sequence numbers (SNs) which are not shared between the ARQ processes.

* * * * *